United States Patent [19]

Obara et al.

[11] 4,014,290
[45] Mar. 29, 1977

[54] COATING APPARATUS FOR BOTTLES

[75] Inventors: Kunio Obara; Masaru Sanda, both of Chiba, Japan

[73] Assignee: Mitsui Shipbuilding and Engineering Co., Ltd., Tokyo, Japan

[22] Filed: Feb. 27, 1974

[21] Appl. No.: 446,463

[30] Foreign Application Priority Data

Feb. 28, 1973 Japan .......................... 48-25316[U]

[52] U.S. Cl. ................................. 118/301; 118/324
[51] Int. Cl.² ........................................... B05C 5/00
[58] Field of Search ............ 118/301, 324, 63, 322, 118/32 Z

[56] References Cited

UNITED STATES PATENTS

| | | | |
|---|---|---|---|
| 2,505,063 | 4/1950 | Palermo | 118/301 |
| 2,721,535 | 10/1955 | Zitkus | 118/301 |
| 3,296,999 | 1/1967 | Gamble | 118/301 X |
| 3,424,129 | 1/1969 | Peeps et al. | 118/324 X |
| 3,741,744 | 6/1973 | Bowman | 118/324 X |
| 3,854,439 | 12/1974 | Aarmuth | 118/324 X |

*Primary Examiner*—John P. McIntosh
*Attorney, Agent, or Firm*—Howson and Howson

[57] ABSTRACT

Spray apparatus for coating bottles with resin except on their bottoms, for the purpose of preventing the explosion of the bottles. In order to prevent adhesion of the resin to the bottom, bottles are suspended and moved in a row and a belt is provided to move together with the suspended bottles below and near their bottoms and at the same speed as the bottles.

2 Claims, 6 Drawing Figures

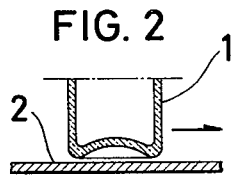
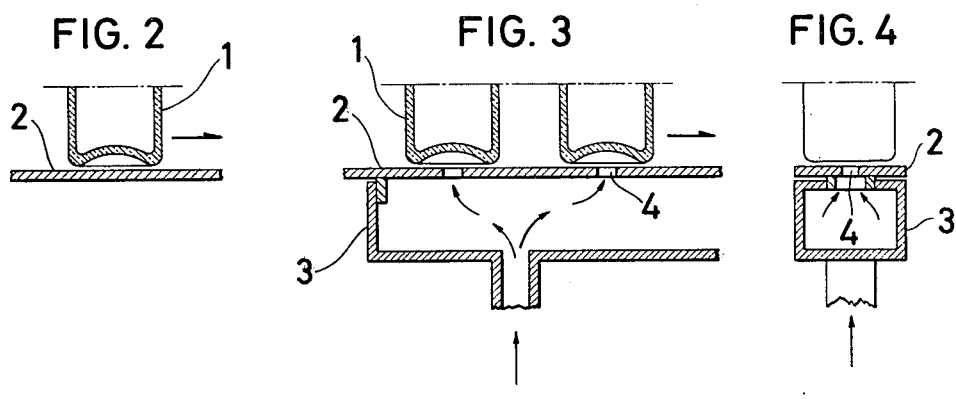
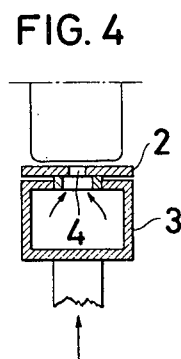
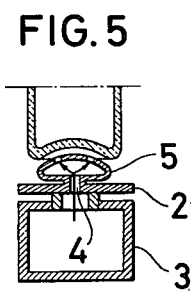
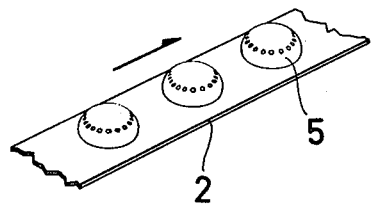

COATING APPARATUS FOR BOTTLES

This invention relates to apparatus for coating bottles with resin or the like for the purpose of, for instance, preventing the explosion of the bottle and, more particularly, to apparatus for coating the bottle except for its bottom. In coating the bottle by spraying powder or liquid, there is a great difficulty in coating only a selected part of the bottle. In the prior art, a sheet is adhered to the part not to be coated. This method, however, requires manual operating before and after the coating, which is a disadvantage in cost and particularly in continuously coating a large number of bottles.

The object of this invention is to provide an apparatus by which a part of the bottle may be coated quickly and simply.

The apparatus according to this invention comprises means for successively feeding a number of suspended bottles and a belt means provided in the position near the bottom of the suspended bottles and adapted to be moved together with the suspended bottles at the same speed as the bottles, wherein the coating is effected in course of the progress of the bottles.

In the drawings;

FIG. 2 is a sectional view of the same;

FIG. 3 is a sectional view showing another embodiment;

FIG. 4 is a sectional view taken along line A-A in FIG. 3;

FIG. 5 is a sectional view showing a further embodiment; and

FIG. 6 is a perspective view showing a part of the belt shown in FIG. 5.

Figure 1:
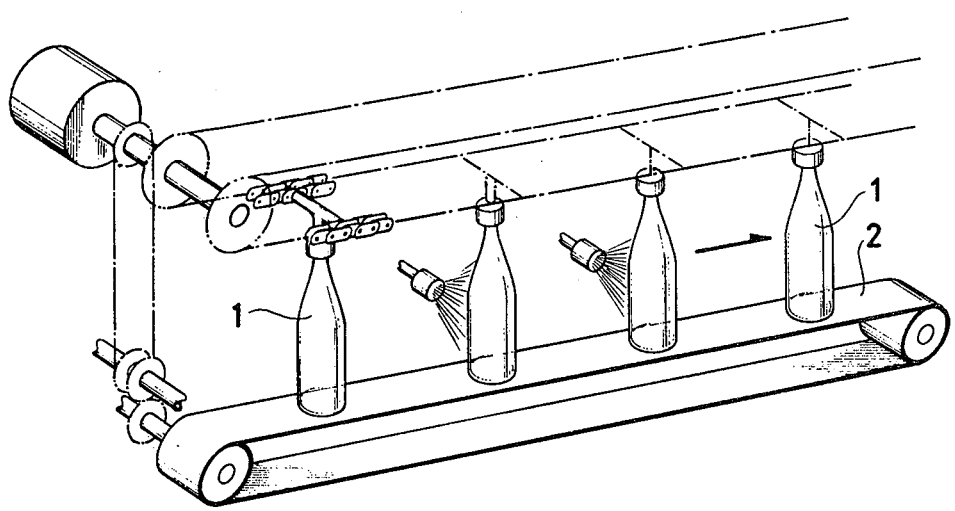
FIG. 1 is a perspective view of an embodiment of the invention.

Referring now to the drawings, and more particularly to FIG. 1, successive bottles 1 are suspended in a straight row and moved in the direction of the arrow. A belt 2 is provided in a coating room below the suspended bottles at the position near the bottom of the bottles and moved in the same direction and at the same speed of the bottles. The coating is effected by resin spraying apparatus during the progress of the bottles over the belt. With this arrangement, paint will not adhere on the bottom of the bottle. In this case, if the speed of the belt differs from that of the bottle, that is, if there is a relative movement between bottle and belt, the paint fallen on the belt may adhere to the bottom of the bottle. The paint fallen on the belt may be wiped off before the belt returns to the upper run. Desirably, the bottom of the bottle and the top of the belt are held as close as possible.

FIGS. 3 and 4 show another embodiment of the invention. In this embodiment, a wind box 3 is provided under the belt having small holes 4, through which air is blown off at a low velocity. With this arrangement, the paint is prevented from adhering to the bottom. It will be noted that each small hole moves together with each bottle.

FIGS. 5 and 6 show a further embodiment, in which a cup-shaped adapter 6 having curvature slightly smaller than that of the bottom of the bottle and having a number of small holes is provided on the belt at each hole 4 formed in the belt. It has been confirmed that with this arrangement sufficient paint shut off effect can be gained if fluctuation of the gap between the bottom of bottle and adapter for individual bottles is kept within 5 millimeters.

From foregoing, it will be understood that this invention provides the apparatus which may coat the bottle except the bottom in continuous and speedy manner.

What is claimed is:

1. Coating apparatus for bottles, comprising means for successively feeding suspended bottles along a predetermined path, moving belt means provided in a position near but spaced directly below the bottoms of said suspended bottles, means moving said belt means in the same direction and at the same speed as said bottles, and means for spraying a coating material onto the exterior sidewalls of said bottles as said bottles and said belt means move together along said path, whereby said belt means acts to prevent the application of said sprayed material to said bottoms of said bottles, said moving belt means being sufficiently close to said bottle bottoms that moving of said belt means in said direction at a different speed than said bottles would result in wiping of sprayed paint from said belt means onto said bottles.

2. Coating apparatus according to claim 1, wherein said belt means has a plurality of holes therethrough at the same mutual spacings as the spacings between the centers of the bottoms of said bottles moving along said path, and a wind box positioned under said belt means for blowing gas against the bottoms of said bottles through said holes.

* * * * *